United States Patent
Chun et al.

(10) Patent No.: US 10,298,540 B2
(45) Date of Patent: May 21, 2019

(54) METHOD AND NETWORK NODE FOR TRANSMITTING IP ADDRESS INFORMATION, AND METHOD AND USER EQUIPMENT FOR RECEIVING IP ADDRESS INFORMATION

(71) Applicant: LG ELECTRONICS INC., Seoul (KR)

(72) Inventors: Sungduck Chun, Seoul (KR); Laeyoung Kim, Seoul (KR); Dongsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 97 days.

(21) Appl. No.: 15/475,859

(22) Filed: Mar. 31, 2017

(65) Prior Publication Data

US 2017/0289098 A1    Oct. 5, 2017

Related U.S. Application Data

(60) Provisional application No. 62/316,594, filed on Apr. 1, 2016.

(51) Int. Cl.
*H04L 29/12* (2006.01)
*H04W 4/40* (2018.01)
*H04W 76/00* (2018.01)
*H04W 84/00* (2009.01)

(52) U.S. Cl.
CPC ........ *H04L 61/2007* (2013.01); *H04L 61/103* (2013.01); *H04W 4/40* (2018.02); *H04W 76/00* (2013.01); *H04W 84/005* (2013.01)

(58) Field of Classification Search
None
See application file for complete search history.

(56) References Cited

U.S. PATENT DOCUMENTS

| | | | | |
|---|---|---|---|---|
| 9,979,790 B1* | 5/2018 | Park | ...................... | H04W 76/10 |
| 2004/0138809 A1* | 7/2004 | Mukaiyama | ..... | G08G 1/096716 |
| | | | | 701/400 |
| 2005/0094616 A1* | 5/2005 | Sakakura | .......... | H04L 29/12132 |
| | | | | 370/349 |
| 2005/0130660 A1* | 6/2005 | Park | ...................... | H04W 36/26 |
| | | | | 455/436 |
| 2009/0245533 A1* | 10/2009 | Gerlach | ................... | H03G 3/32 |
| | | | | 381/86 |
| 2011/0306329 A1* | 12/2011 | Das | ...................... | G08B 25/016 |
| | | | | 455/416 |
| 2013/0253777 A1* | 9/2013 | Tengler | .................. | G01C 21/26 |
| | | | | 701/45 |
| 2013/0329634 A1* | 12/2013 | Correia | ................... | H04W 8/26 |
| | | | | 370/328 |
| 2014/0258457 A1* | 9/2014 | Han | .................... | H04L 61/2007 |
| | | | | 709/217 |

(Continued)

*Primary Examiner* — Bunjob Jaroenchonwanit
(74) *Attorney, Agent, or Firm* — Birch, Stewart, Kolasch & Birch, LLP

(57) ABSTRACT

Provided is a method for making it impossible to track a vehicle performing vehicle-to-everything (V2X) communication through a network. The network may allocate the same IP address to all UEs performing V2X communication. Since the UEs performing V2X communication transmit data using the same IP address, an application server cannot track a vehicle transmitting corresponding data.

12 Claims, 8 Drawing Sheets

(56) References Cited

U.S. PATENT DOCUMENTS

| | | | | |
|---|---|---|---|---|
| 2014/0309880 A1* | 10/2014 | Ricci | ............... | H04W 4/21 |
| | | | | 701/36 |
| 2015/0146605 A1* | 5/2015 | Rubin | ............... | G08G 9/02 |
| | | | | 370/312 |
| 2015/0215274 A1* | 7/2015 | Imadali | ............... | H04L 61/6059 |
| | | | | 709/245 |
| 2016/0119419 A1* | 4/2016 | Choi | ............... | B60K 35/00 |
| | | | | 701/36 |
| 2016/0227551 A1* | 8/2016 | Freeman | ............... | H04W 28/0289 |
| 2017/0019295 A1* | 1/2017 | Kim | ............... | H04L 12/24 |
| 2017/0093643 A1* | 3/2017 | Ricci | ............... | H04W 4/90 |
| 2017/0290009 A1* | 10/2017 | Feng | ............... | H04W 72/04 |
| 2017/0332230 A1* | 11/2017 | Bitar | ............... | H04W 8/26 |
| 2017/0367098 A1* | 12/2017 | Byun | ............... | H04L 5/0053 |
| 2018/0124181 A1* | 5/2018 | Binder | ............... | H04L 67/12 |
| 2018/0132208 A1* | 5/2018 | Pan | ............... | H04W 4/06 |
| 2018/0152819 A1* | 5/2018 | Pinheiro | ............... | H04W 4/40 |
| 2018/0206089 A1* | 7/2018 | Cavalcanti | ............... | H04W 36/0083 |
| 2018/0242385 A1* | 8/2018 | Chandramouli | ............... | H04L 67/12 |

* cited by examiner (a) UE-P-GW user plane with E-UTRAN (b) Control Plane UE-MME

METHOD AND NETWORK NODE FOR TRANSMITTING IP ADDRESS INFORMATION, AND METHOD AND USER EQUIPMENT FOR RECEIVING IP ADDRESS INFORMATION

CROSS-REFERENCE TO RELATED APPLICATIONS

This application claims the benefit of U.S. Provisional Application Ser. No. 62/316,594, filed on Apr. 1, 2016, the contents of which are all hereby incorporated by reference herein in their entirety.

TECHNICAL FIELD

The present invention relates to a wireless communication system and, more particularly, to a method and apparatus for transmitting/receiving IP address information.

BACKGROUND ART

Wireless communication systems are widely deployed to provide various kinds of communication content such as voice and data services. Generally, these communication systems are multiple access systems capable of supporting communication with multiple users by sharing available system resources (e.g., bandwidth and transmission power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

TECHNICAL PROBLEM

A method for effectively processing vehicle application data in a vehicle-to-everything (V2X) communication system is needed.

In addition, a method for protecting privacy in a V2X communication process is needed.

The technical objects that can be achieved through the present invention are not limited to what has been particularly described hereinabove and other technical objects not described herein will be more clearly understood by persons skilled in the art from the following detailed description.

SUMMARY

A method for making it impossible to track a vehicle performing vehicle-to-everything (V2X) communication through a network is provided. The network may allocate the same IP address to all UEs performing V2X communication. Since the UEs performing V2X communication transmit data using the same IP address, an application server cannot track a vehicle that has transmitted the data.

According to an aspect of the present invention, a method of transmitting Internet protocol (IP) address information by a network node in a wireless communication system is provided. The method includes receiving an IP address allocation request from a user equipment (UE), allocating a specific IP address defined for vehicle-to-everything (V2X) communication to the UE when the IP address allocation request is for V2X communication, and notifying the UE of the specific IP address. The same IP address as the specific IP address may be allocated to every UE requesting IP address allocation for V2X communication.

According to another aspect of the present invention, a network node for transmitting Internet protocol (IP) address information in a wireless communication system is provided. The network node includes a radio frequency (RF) unit and a processor configured to control the RF unit. The processor may control the RF unit to receive an IP address allocation request from a user equipment (UE), allocate a specific IP address defined for vehicle-to-everything (V2X) communication to the UE when the IP address allocation request is for V2X communication, and notify the UE of the specific IP address. The same IP address as the specific IP address may be allocated to every UE requesting IP address allocation for V2X communication.

According to another aspect of the present invention, a method of receiving Internet protocol (IP) address information by a user equipment in a wireless communication system is provided. The method includes transmitting an IP address allocation request to a network node and receiving IP address information about an IP address allocated to the UE from the network node. If the IP address allocation request is for vehicle-to-everything (V2X) communication, a specific IP address defined for V2X communication may be allocated to the UE. The specific IP address may be the same as that allocated to every UE requesting IP address allocation for V2X communication.

According to another aspect of the present invention, a user equipment (UE) for receiving Internet protocol (IP) address information in a wireless communication system is provided. The UE includes a radio frequency (RF) unit and a processor configured to control the RF unit. The processor may control the RF unit to transmit an IP address allocation request to a network node, and receive IP address information about an IP address allocated to the UE from the network node. If the IP address allocation request is for vehicle-to-everything (V2X) communication, a specific IP address defined for V2X communication may be allocated to the UE. The specific IP address may be the same as that allocated to every UE requesting IP address allocation for V2X communication.

In each aspect of the present invention, the IP address allocation request may be transmitted by the UE or received by the network using a packet data network (PDN) connectivity request message.

In each aspect of the present invention, the specific IP address may be identically allocated to UEs requesting connectivity to a PDN for V2X communication or transmitting an IP address allocation request associated with an access point name (APN) for V2X communication.

In each aspect of the present invention, the UE may transmit uplink V2X data to the network node using the specific IP address.

In each aspect of the present invention, the network node may transmit the uplink V2X data to an application server for V2X communication.

In each aspect of the present invention, the network node may be a packet data network gateway.

The above technical solutions are merely some parts of the embodiments of the present invention and various embodiments into which the technical features of the present invention are incorporated can be derived and understood by persons skilled in the art from the following detailed description of the present invention.

According to the present invention, vehicle application data can be effectively processed in a V2X communication system.

According to the present invention, V2X communication can be performed while satisfying privacy requirements.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWING

The accompanying drawings, which are included to provide a further understanding of the invention, illustrate embodiments of the invention and together with the description serve to explain the principle of the invention.

DETAILED DESCRIPTION

Figure 1:
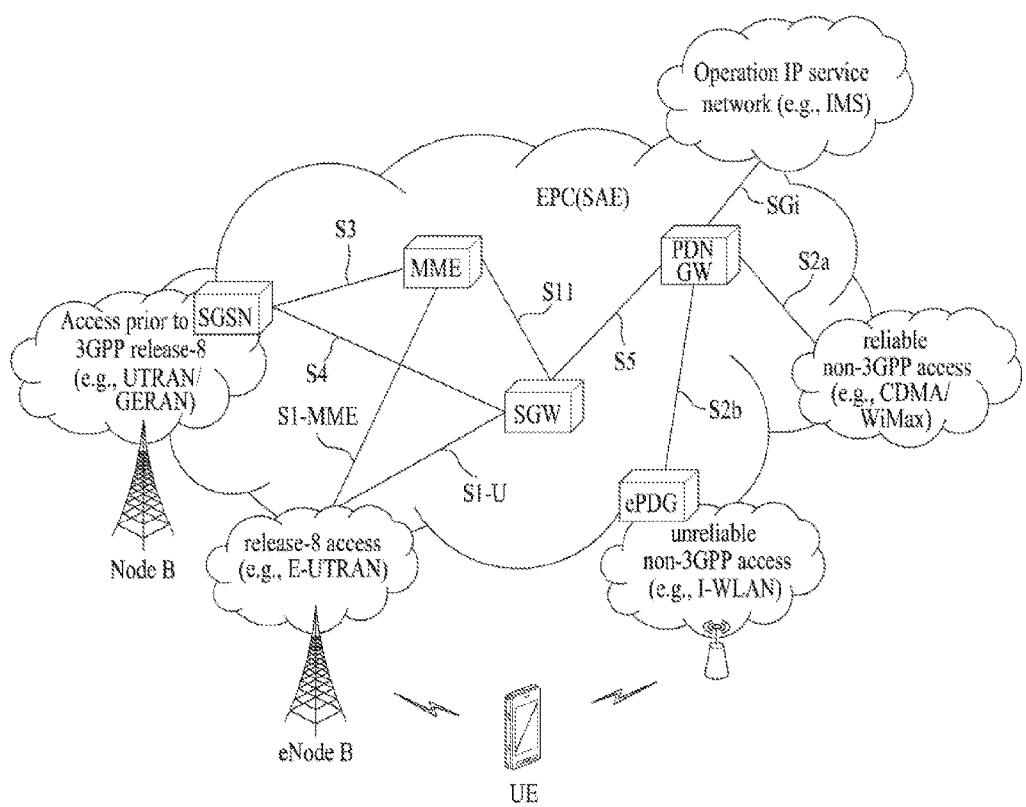
FIG. 1 is a schematic diagram showing the structure of an evolved packet system (EPS) including an evolved packet core (EPC).

Although the terms used in the present invention are selected from generally known and used terms while considering functions of the present invention, they may vary according to intention or customs of those skilled in the art or emergence of new technology. Some of the terms mentioned in the description of the present invention may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The embodiments of the present invention described hereinbelow are combinations of elements and features of the present invention. The elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a" (or "an"), "one", "the", etc. may include a singular representation and a plural representation in the context of the present invention (more particularly, in the context of the following claims) unless indicated otherwise in the specification or unless context clearly indicates otherwise.

The embodiments of the present invention can be supported by standard specifications disclosed for at least one of wireless access systems including an institute of electrical and electronics engineers (IEEE) 802.xx, a 3rd generation partnership project (3GPP) system, a 3GPP Long Term Evolution (3GPP LTE) system, and a 3GPP2 system. That is, steps or parts that are not described to clarify the technical features of the present invention may be explained with reference to the above standard specifications.

In addition, all terms set forth herein may be explained by the above standard specifications. For example, the present disclosure may be incorporated by reference by one or more of standard specifications, such as 3GPP TS 36.300, 3GPP TS 36.321, 3GPP TS 36.322, 3GPP TS 36.323, 3GPP TS 36.331, 3GPP TS 23.303, 3GPP TS 23.401, 3GPP TS 24.301, 3GPP TR 22.885, 3GPP TR 23.785, 3GPP TS 23.285, 3GPP TS 23.246, 3GPP TS 23.468, ETS1 TS 302 637-2, ETS1 TS 302 637-3, ETS TR 102 638, and IEEE 1609.12.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

Specific terms used for the embodiments of the present invention are provided to aid in understanding of the present invention. These specific terms may be replaced with other terms within the scope and spirit of the present invention. The terms used in this specification are defined as follows.

IMS (IP Multimedia Subsystem or IP Multimedia Core Network Subsystem): An architectural framework for providing standardization for delivery of voice or other multimedia services over Internet protocol (IP).

UMTS (Universal Mobile Telecommunications System): Global System for Mobile Communication (GSM)-based 3rd generation mobile communication technology developed by 3GPP.

EPS (Evolved Packet System): A network system configured by an EPC (Evolved Packet Core), which is an Internet Protocol (IP)-based packet switched (PS) core network and an access network such as LTE, UTRAN, etc. The EPS is evolved from UMT.

NodeB: A base station of GERAN/UTRAN which is installed outdoors and has coverage of a macro cell scale.

eNodeB/eNB: A base station of E-UTRAN which is installed outdoors and has coverage of a macro cell scale.

UE (User Equipment): A user equipment. The UE may be referred to as a terminal, ME (Mobile Equipment), MS (Mobile Station), or the like. The UE may be a portable device such as a notebook computer, cellular phone, PDA (Personal Digital Assistant), smartphone, and multimedia device, or may be a nonportable device such as a PC (Personal Computer) and vehicle-mounted device. The term UE or terminal in the description of MTC may refer to an MTC device.

HNB (Home NodeB): A base station of a UMTS network. The HNB is installed indoors and has coverage of a micro cell scale.

HeNB (Home eNodeB): A base station of an EPS network. The HeNB is installed indoors and has coverage of a micro cell scale.

MME (Mobility Management Entity): A network node of the EPS network performing functions of Mobility Management (MM) and Session Management (SM).

PDN-GW (Packet Data Network-Gateway)/PGW/P-GW: A network node of the EPS network performing functions of UE IP address allocation, packet screening and filtering, and charging data collection.

SGW (Serving Gateway)/S-GW: A network node of the EPS network performing functions of mobility anchor, packet routing, idle mode packet buffering, and triggering of the MME paging the UE.

PCRF (Policy and Charging Rule Function): A network node of the EPS network making a policy decision for dynamically applying a differentiated QoS and charging policy on a service flow basis.

OMA DM (Open Mobile Alliance Device Management): A protocol designed for management of mobile devices such as a cellular phone, a PDA, and a portable computer, that performs functions of device configuration, firmware upgrade, and error report.

OAM (Operation Administration and Maintenance): A group of network management functions that provides network defect indication, performance information, and data and diagnosis functions.

NAS (Non-Access Stratum): An upper stratum of a control plane between the UE and the MME. The NAS is a functional layer for signaling between a UE and a core network and exchange of a traffic message between the UE and the core network in LTE/UMTS protocol stack. The NAS mainly functions to support UE mobility and a session management procedure for establishing and maintaining IP connection between a UE and a PDN GW.

EMM (EPS Mobility Management): A sub-layer of a NAS layer, that may be in either an "EMM-Registered" or "EMM-Deregistered" state depending on whether a UE is attached to or detached from a network.

ECM (EMM Connection Management) connection: A signaling connection for exchange of a NAS message, established between the UE and an MME. The ECM connection is a logical connection consisting of an RRC connection between the UE and an eNB and an S1 signaling connection between the eNB and the MME. If the ECM connection is established/terminated, the RRC connection and the S1 signaling connection are all established/terminated as well. To the UE, an established ECM connection means having an RRC connection established with the eNB and, to the MME, the established ECM connection means having an S1 signaling connection established with the eNB. Depending on whether a NAS signaling connection, i.e., the ECM connection, is established, ECM may be in either "ECM-Connected" or "ECM-Idle" state.

AS (Access-Stratum): This includes a protocol stack between the UE and a wireless (or access) network and is in charge of data and network control signal transmission.

NAS configuration MO (Management Object): An MO used in the process of configuring parameters related to NAS functionality for the UE.

PDN (Packet Data Network): A network where a server (e.g., an MMS (Multimedia Messaging Service) server, a WAP (Wireless Application Protocol) server, etc.) supporting a specific service is located.

PDN connection: A logical connection between a PDN and a UE represented by one IP address (one IPv4 address and/or one IPv6 prefix).

APN (Access Point Name): A text sequence for indicating or identifying a PDN. A requested service or network is accessed through a specific P-GW. The APN means a predefined name (text sequence) in a network so as to discover this P-GW. (e.g., internet.mnc012.mcc345.gprs).

RAN (Radio Access Network): A unit including a NodeB, an eNodeB and an RNC (Radio Network Controller) for controlling the NodeB and the eNodeB in a 3GPP network. The RAN is present between UEs and provides connection to the core network.

HLR (Home Location Register)/HSS(Home Subscriber Server): A database containing subscriber information of a 3GPP network. The HSS can perform functions such as configuration storage, identity management and user state storage.

PLMN (Public Land Mobile Network): A network configured for the purpose of providing mobile communication services to individuals. This network can be configured per operator.

ANDSF (Access Network Discovery and Selection Function): One network entity that provides a policy to discover and select access that the UE can use with respect to each service provider.

EPC path (or infrastructure data path): A user plane communication path through an EPC.

E-RAB (E-UTRAN Radio Access Bearer): Concatenation of an S1 bearer and a data radio bearer corresponding to the S1 bearer. If the E-RAB is present, there is one-to-one mapping between the E-RAB and an EPS bearer of a NAS.

GTP (GPRS Tunneling Protocol): A group of IP-based communication protocols used to carry a general packet radio service (GPRS) within GSM, UMTS, and LTE networks. In 3GPP architectures, GTP and proxy mobile IPv6 based interfaces are specified on various interface points. The GTP can be decomposed into some protocols (e.g., GTP-C, GTP-U, and GTP'). GTP-C is used within a GPRS core network for signaling between gateway GPRS support nodes (GGSN) and serving GPRS support nodes (SGSN). GTP-C allows the SGSN to activate a session on a user's behalf (e.g., PDN context activation), deactivate the same session, adjust quality of service parameters, or update a session for a subscriber that has just arrived from another SGSN. GTP-U is used to carry user data within the GPRS core network and between a radio access network and a core network.

Proximity service (or ProSe service or proximity based service): A service for enabling discovery and mutual direct communication, communication via an eNB, or communication via a third device, between physically adjacent devices. In this case, user plane data is exchanged through a direct data path without passing through a 3GPP core network (e.g., EPC).

ProSe communication: Communication through a ProSe communication path between two or more ProSe-enabled UEs. Unless mentioned otherwise, ProSe communication means one of ProSe E-UTRA communication, ProSe-assisted WLAN direct communication between two UEs, ProSe group communication, and ProSe broadcast communication.

ProSe E-UTRA communication: ProSe communication using a ProSe E-UTRA communication path.

ProSe-assisted WLAN direct communication: ProSe communication using a direct communication path.

ProSe communication path: A communication path supporting ProSe communication. A ProSe E-UTRA communication path may be established between ProSe-enabled UEs or through a local eNB, using E-UTRA. A ProSe-assisted WLAN direct communication path may be directly established between ProSe-enabled UEs, using a WLAN.

EPC path (or infrastructure data path): A user plane communication path through an EPC.

ProSe discovery: A process of identifying/confirming adjacent ProSe-enabled UEs, using E-UTRA.

ProSe group communication: One-to-multi ProSe communication using a common communication path, between two or more adjacent ProSe-enabled UEs.

ProSe UE-to-network relay: A ProSe-enabled public safety UE operating as a communication relay between a ProSe-enabled network and a ProSe-enabled UE, using E-UTRA.

Remote UE: A ProSe-enabled UE connected to an EPC network through the ProSe UE-to-network relay, i.e., communicating through a PDN, without being serviced by an E-UTRAN.

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW (or S-GW) operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW (or P-GW) corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network.

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference Point | Description |
| --- | --- |
| S1-MME | Reference point for the control plane protocol between E-UTRAN and MME. |
| S1-U | Reference point between E-UTRAN and Serving GW for the per bearer user plane tunneling and inter eNB path switching during handover. |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and Serving GW. |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses.) |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
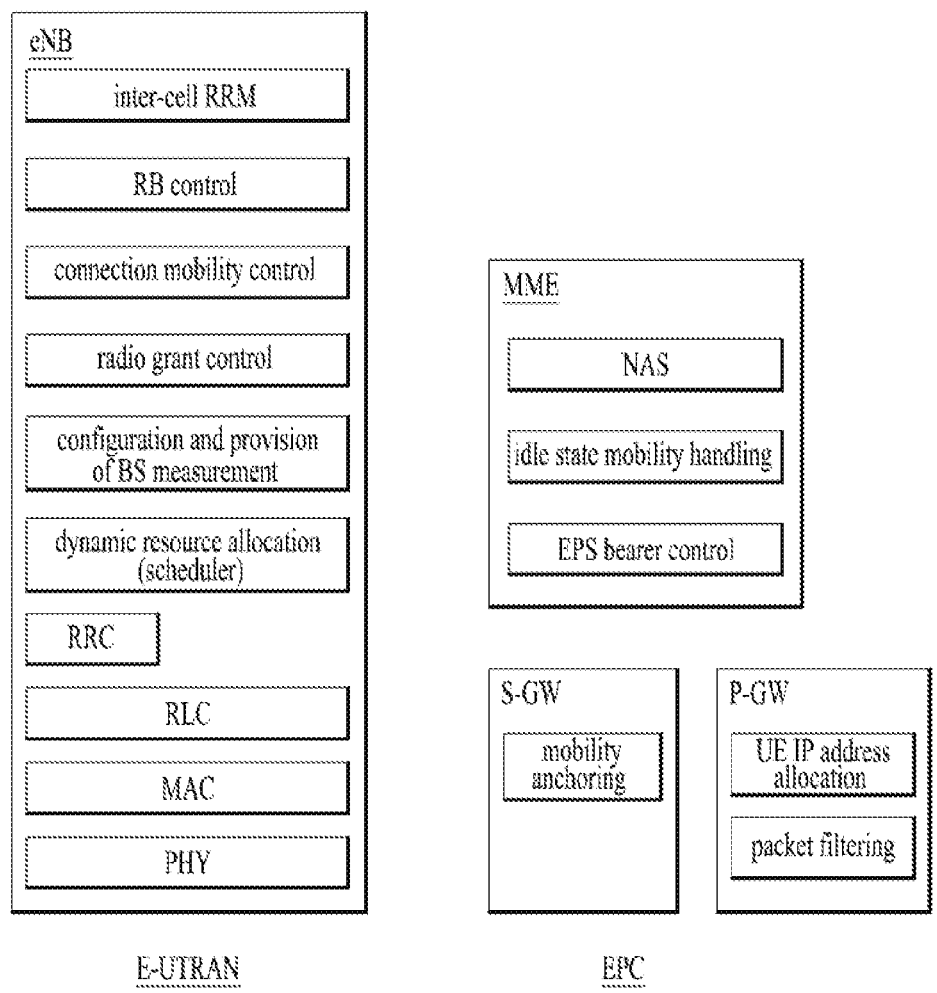
FIG. 2 is a diagram exemplarily illustrating architectures of a general E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
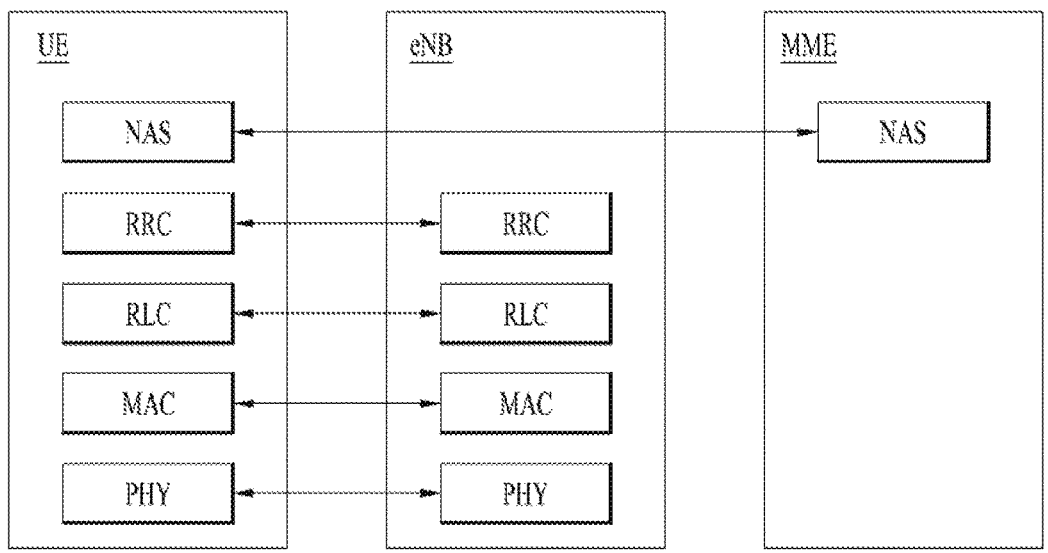
FIG. 3 is a diagram exemplarily illustrating the structure of a radio interface protocol in a control plane.
Figure 4:
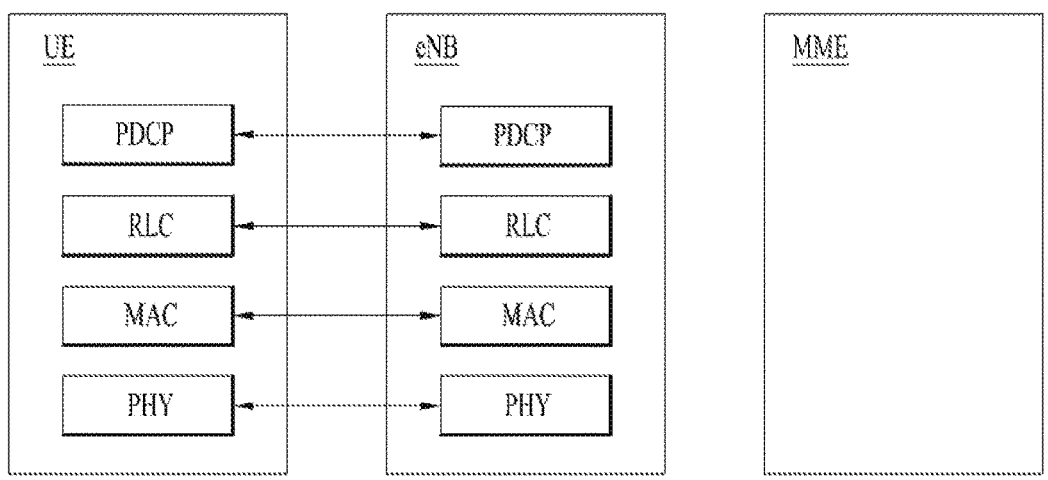
FIG. 4 is a diagram exemplarily illustrating the structure of an radio interface protocol in a user plane.

FIG. 3 is a diagram exemplarily illustrating the structure of a radio interface protocol in a control plane between a UE and an eNB, and FIG. 4 is a diagram exemplarily illustrating the structure of a radio interface protocol in a user plane between the UE and the eNB.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel. Data is transferred between the physical layer and the MAC layer through the transport channel. Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (Evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

The UE requested PDN connectivity procedure is for a UE to request the setup of a default EPS bearer to a PDN. The UE requests connectivity to a PDN by sending a PDN connectivity request message to the network. If accepted by the network, this procedure initiates the establishment of a default EPS bearer context. If EMM-REGISTERED without PDN connection is not supported by the UE or the MME, for the UE having no PDN connection, the procedure is used either to establish the first default bearer by including the PDN connectivity request message into the initial attach message. Otherwise, the procedure is used to establish subsequent default bearers to additional PDNs in order to allow the UE simultaneous access to multiple PDNs by sending the message stand-alone. If EMM-REGISTERED without PDN connection is supported by the UE and the MME, the procedure is used to establish the first or subsequent default bearers to a PDN or additional PDNs by sending the PDN connectivity request message stand-alone.

When the PDN connectivity request message is sent together with an attach request message, the UE may not include the APN. In order to request connectivity to a PDN using the default APN, the UE includes the access point name IE in the PDN connectivity request message or, when applicable, in the ESM information response message, according to specific conditions. In order to request connectivity to an additional PDN using a specific APN, the UE includes the requested APN in the PDN request message.

Figure 5:
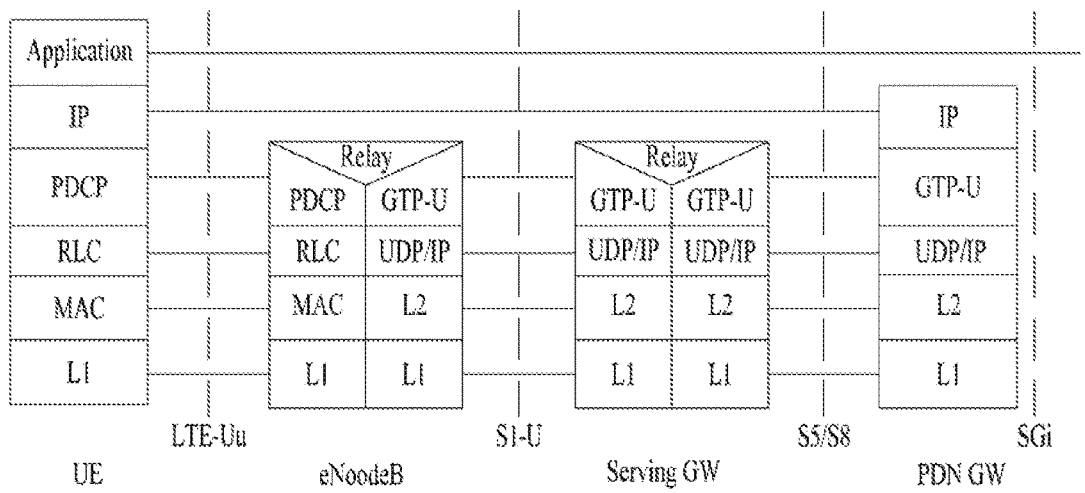
FIG. 5 is a diagram illustrating LTE (Long Term Evolution) protocol stacks for a user plane and a control plane.
Figure 5:
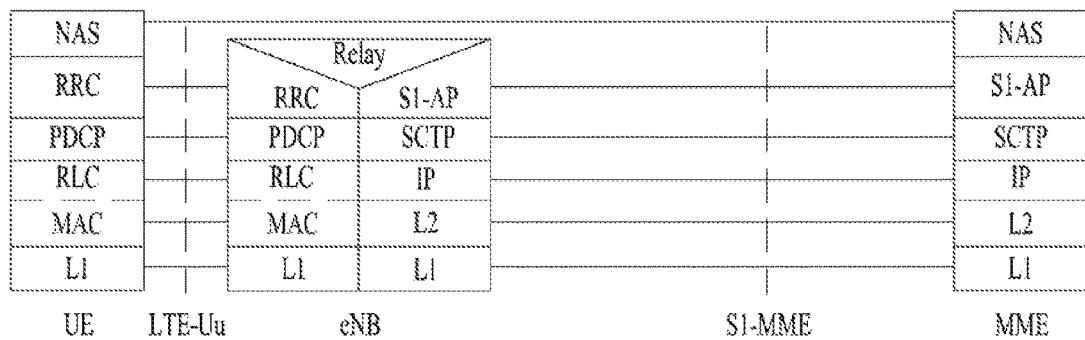

FIG. 5 illustrates LTE protocol stacks for a user plane and a control plane. FIG. 5(a) illustrates user plane protocol stacks over UE-eNB-SGW-PGW-PDN and FIG. 5(b) illustrates control plane protocol stacks over UE-eNB-MME-SGW-PGW. Functions of key layers of the protocol stacks will now be briefly described below.

Referring to FIG. 5(a), a GTP-U protocol is used to forward user IP packets over an S1-U/S5/X2 interface. If a GTP tunnel is established to forward data during LTE handover, an end marker packet is transferred to the GTP tunnel as the last packet.

Referring to FIG. 5(b), an S1-AP protocol is applied to an S1-MME interface. The S1-AP protocol supports functions such as S1 interface management, E-RAB management, NAS signaling delivery, and UE context management. The S1-AP protocol transfers an initial UE context to the eNB in order to set up E-RAB(s) and then manages modification or release of the UE context. A GTP-C protocol is applied to S11/S5 interfaces. The GTP-C protocol supports exchange of control information for generation, modification, and termination of GTP tunnel(s). The GTP-C protocol generates data forwarding tunnels in the case of LTE handover.

A description of the protocol stacks and interfaces illustrated in FIGS. 3 and 4 is applicable to the same protocol stacks and interfaces illustrated in FIG. 5.

Figure 6:
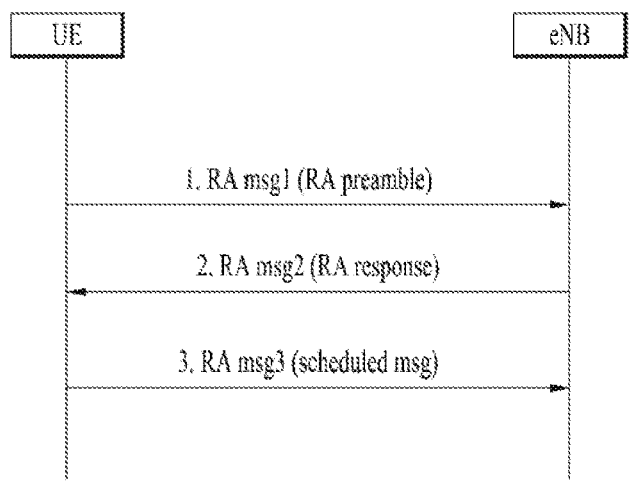
FIG. 6 is a flow diagram illustrating a random access procedure.

FIG. 6 is a flowchart illustrating a random access procedure in 3GPP LTE.

The random access procedure is used for a UE to obtain UL synchronization with a base station or to be assigned a UL radio resource.

The UE receives a root index and a physical random access channel (PRACH) configuration index from an eNB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The random access procedure, in particular, a contention-based random access procedure, includes the following three steps. Messages transmitted in the following steps 1, 2, and 3 are referred to as msg1, msg2, and msg4, respectively.

1. The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.
2. Upon receiving the random access preamble, the eNB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH. The RAR includes timing advance (TA) information indicating timing offset information for UL synchronization, UL resource allocation information (UL grant information), and a temporary UE identifier (e.g., a temporary cell-RNTI (TC-RNTI)).
3. The UE may perform UL transmission according to resource allocation information (i.e., scheduling information) and a TA value in the RAR. HARQ is applied to UL transmission corresponding to the RAR. Accordingly, after performing UL transmission, the UE may receive reception response information (e.g., a PHICH) corresponding to UL transmission.

Figure 7:
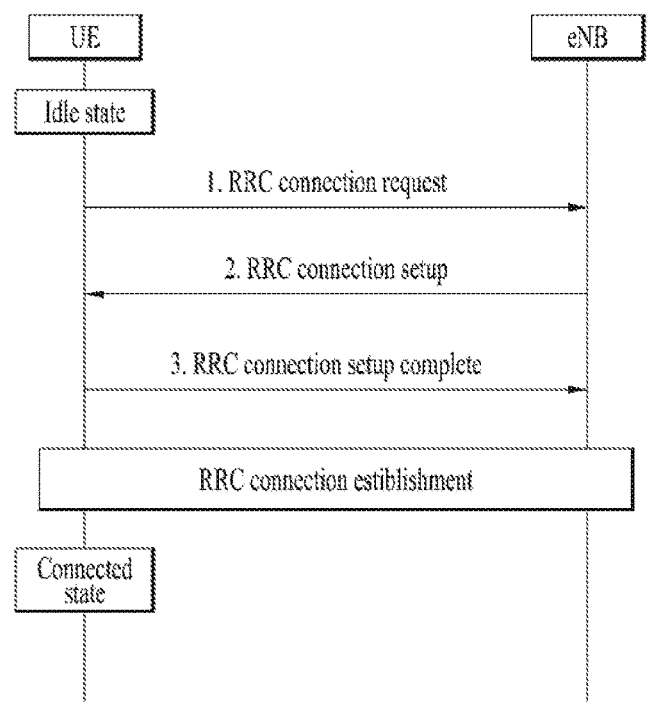
FIG. 7 is a diagram illustrating a connection procedure in a radio resource control (RRC) layer.

FIG. 7 illustrates a connection procedure in a radio resource control (RRC) layer.

As shown in FIG. 7, the RRC state is set according to whether or not RRC connection is established. An RRC state indicates whether or not an entity of the RRC layer of a UE has logical connection with an entity of the RRC layer of an eNB. An RRC state in which the entity of the RRC layer of the UE is logically connected with the entity of the RRC layer of the eNB is called an RRC connected state. An RRC state in which the entity of the RRC layer of the UE is not logically connected with the entity of the RRC layer of the eNB is called an RRC idle state.

A UE in the Connected state has RRC connection, and thus the E-UTRAN may recognize presence of the UE in a cell unit. Accordingly, the UE may be efficiently controlled. On the other hand, the eNB cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, does the UE establish RRC connection with the RRC layer of the eNB through the RRC connection procedure and then transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNB, transmission of an RRC connection setup message from the eNB to the UE, and transmission of an RRC connection setup complete message from the UE to eNB, which are described in detail below with reference to FIG. 7.

1. When the UE in the idle state desires to establish RRC connection for reasons such as an attempt to make a call, a data transmission attempt, or a response of the eNB to paging, the UE transmits an RRC connection request message to the eNB first.
2. Upon receiving the RRC connection request message from the UE, the eNB accepts the RRC connection request of the UE when the radio resources are sufficient, and then transmits an RRC connection setup message, which is a response message, to the UE.
3. Upon receiving the RRC connection setup message, the UE transmits an RRC connection setup complete message to the eNB.

Only when the UE successfully transmits the RRC connection setup complete message, does the UE establish RRC connection with the eNB and transition to the RRC connected mode.

In order for the UE of an idle state to transition to an activation state in which traffic transmission/reception can be performed due to occurrence of new traffic, a service request procedure is performed. If traffic to be transmitted by the UE occurs or traffic to be transmitted to the UE by a network occurs in a state in which the UE is registered with the network but an S1 connection is released and a wireless resource is not allocated to the UE due to traffic inactivation, i.e., in a state in which the UE is in an EMM registered state (EMM-Registered) but is in an ECM-Idle state, the UE requests that the network provide a service. Upon successfully completing the service request process, the UE transitions to an ECM connected state (ECM-Connected) and configures an ECM connection (RRC connection+S1 signaling connection) in a control plane and an E-RAB (a data radio bearer (DRB) and an S1 bearer) in a user plane, thereby transmitting/receiving traffic. If the network desires to transfer traffic to the UE of an ECM idle state (ECM-Idle), the network informs the UE, through a paging message, that there is traffic to be transmitted so that the UE may request that the network provide a service.

Figure 8:
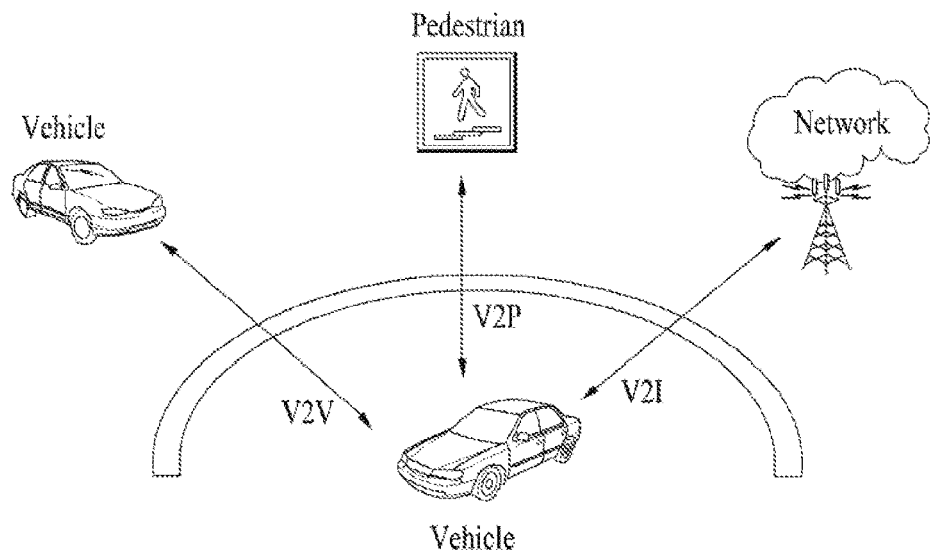
FIG. 8 is a diagram illustrating a vehicle-to-everything (V2X) communication environment.

FIG. 8 is a diagram illustrating a vehicle-to-everything (V2X) communication environment.

If a vehicle accident happens, significant injury and property damage may occur. Therefore, demand for technology capable of guaranteeing safety of pedestrians as well as safety of people riding in a vehicle is increasing. Thus, technology based on hardware and software specialized for a vehicle has been incorporated into the vehicle.

LTE based V2X communication technology evolved from 3GPP shows a trend of incorporating information technology (IT) into the vehicle. A connectivity function is applied to some vehicle models and a study supporting vehicle-to-vehicle (V2V) communication, vehicle-to-infrastructure (V2I) communication, vehicle-to-pedestrian (V2P) communication, and vehicle-to-network (V2N) communication has continued due to evolution of a communication function.

According to V2X communication, a vehicle continues to broadcast information about the location, velocity, and direction thereof. A contiguous vehicle that has received the broadcast information uses the information for the purpose of accident prevention by recognizing movement of vehicles therearound.

That is, similar to the case in which a person possesses a UE such as a smartphone or a smartwatch, a vehicle also mounts a UE of a specific type therein. In this case, the UE mounted in the vehicle is a device to which an actual communication service is provided by a communication network. For example, the UE mounted in the vehicle may be connected to an eNB in an E-UTRAN and receive a communication service.

However, there are many considerations to implement V2X communication in the vehicle because astronomical costs are consumed to install traffic safety infrastructure such as a V2X eNB. That is, in order to support V2X communication on all roads on which vehicles can move, hundreds of thousands of V2X eNBs should be installed. In addition, since each network node accesses the Internet or a central control server on a wired network basis for the purpose of stable communication with a server, a wired network should be installed and installation and maintenance costs of the wired network are high.

To effectively support V2X in an LTE or EPS system, QoS optimized for data generated in a V2X application needs to be provided.

A message for a V2X service includes a message that a UE periodically transmits and a message that the UE transmits upon occurrence of a specific event. For use cases and characteristics of these messages, reference is made to 3GPP TR 22.885. In addition, various ITS related use cases and V2X messages are defined in ETSI. For example, messages of a co-operative awareness message (CAM) type and messages of a decentralized environmental notification message (DENM) type and use cases of these messages are defined in ETS1 ITS.

The V2X messages should be received by all UEs in a region (range) within which the messages are valid in terms of road safety. As such, the V2X messages may be transmitted using a broadcast scheme such as multimedia broadcast multicast services (MBMS) or single-cell point-to-multipoint (SC-PTM). For an evolved MBMS (eMBMS) architecture for the V2X service, refer to 3GPP TR 23.785. A new function called a V2X application server (V2X AS) and reference points such as VC1, VMB2, and LTE-Uu are defined in the eMBMS architecture for the V2X service. The V2X AS is the logical function that is used for network related actions required for V2X. It is similar to the Group Communication System Application Server (GCS AS). The VC1 is the reference point between the V2X AS and the application client on the UE, the VMB2 is the reference point between the V2X AS and the BM-SC, and the LTE-Uu the reference point between the V2X enabled UE and the E-UTRAN. For details of the MBMS, refer to 3GPP TS 23.246, 3GPP TS 23.468, or 3GPP TS 36.300.

Figure 9:
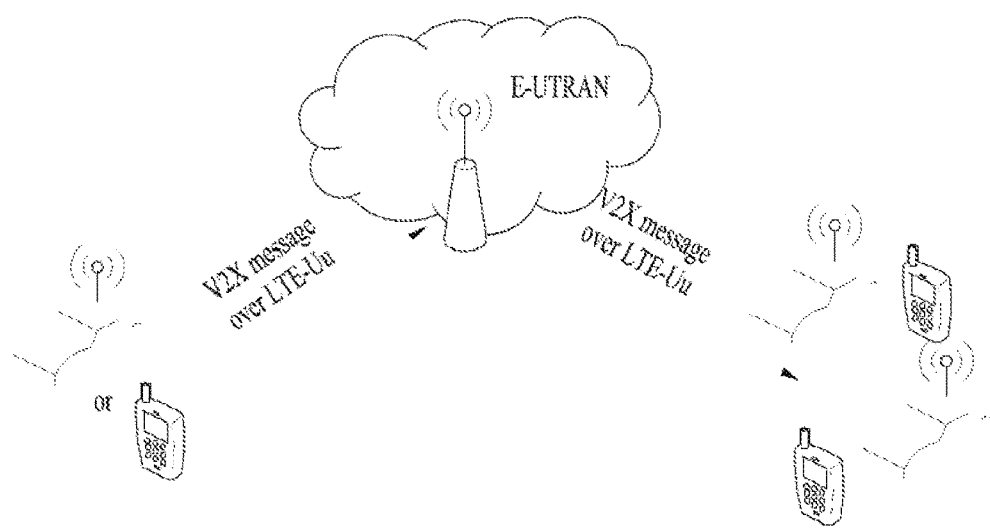
FIG. 9 illustrates V2X message transmission/reception for a V2V/V2P service via an LTE-Uu.

FIG. 9 illustrates V2X message transmission/reception for a V2V/V2P service via an LTE-Uu.

Section 6.3 of 3GPP TR 23.785 v0.2.0 defines a V2X message transmission/reception related solution for LTE-Uu based V2V and V2P services. Transmission/reception of a V2X message based on the LTE-Uu (e.g., defined in 3GPP TS 22.185) needs to satisfy predetermined latency requirements.

A UE may transmit the V2X message via the LTE-Uu and the V2X message may be forwarded to a plurality of UEs over the LTE-Uu as illustrated in FIG. 9.

Figure 10:
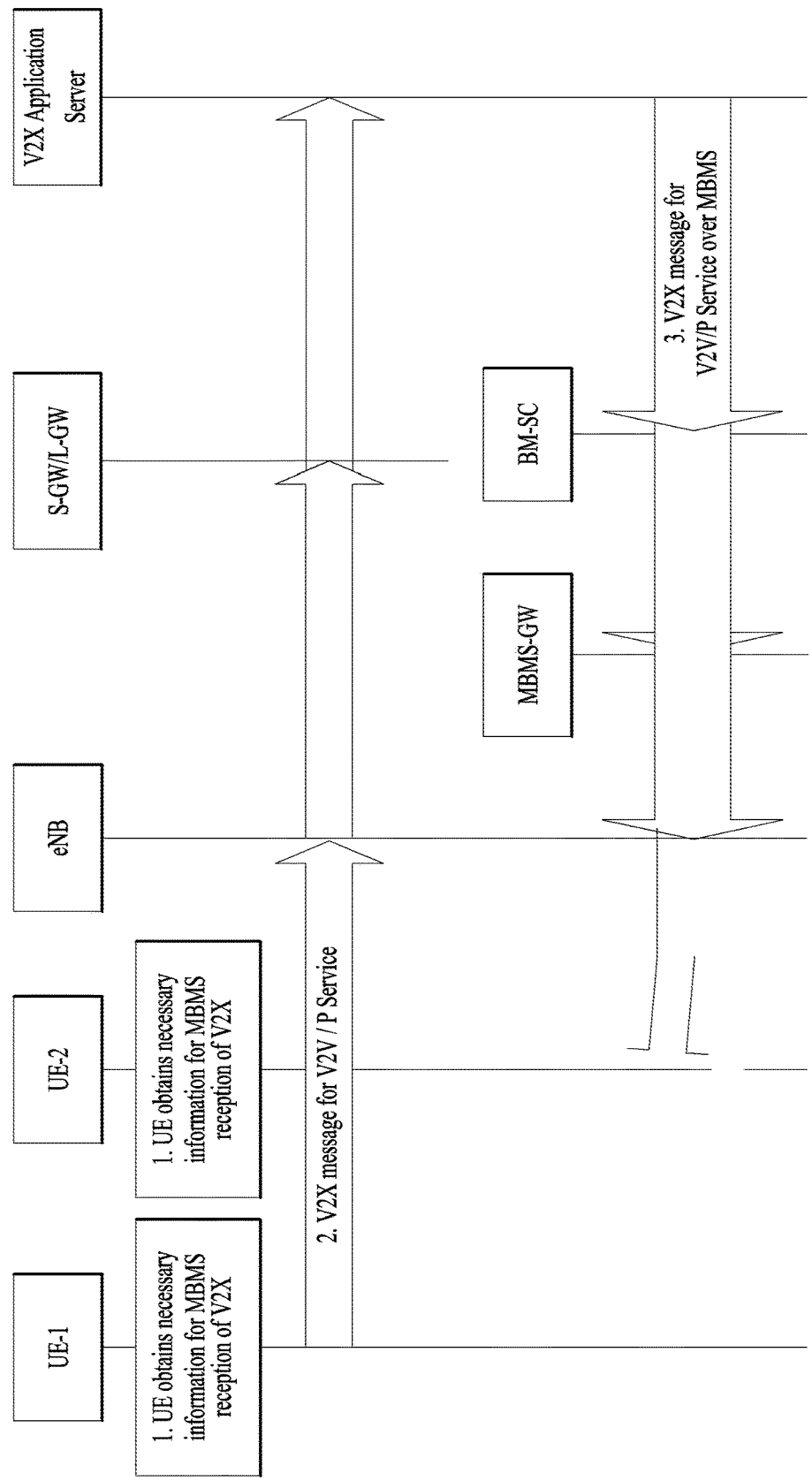
FIG. 10 illustrates a V2X message transmission/reception procedure for a V2V/V2P service via an LTE-Uu.

FIG. 10 illustrates a V2X message transmission/reception procedure for a V2V/V2P service via an LTE-Uu.

1. UE obtains necessary information for MBMS reception of V2X message for V2V/P Services.
2. UE-1 sends a V2X message over LTE-Uu. UE-1 has already established a Selective IP Traffic Offload (SIPTO) at the local network PDN connection to transmit the V2X message for V2V/P Services over LTE-Uu as described in TS 23.401. The eNB receives the V2X message and the V2X message is routed to the V2X Application Server via S-GW/L-GW.
3. The V2X Application Server decides to forward the V2X message and the target area of the message. The V2X Application Server sends the V2X message to the target area of the message by MBMS delivery. The MBMS bearer used for MBMS delivery can be pre-established.

Meanwhile, in Europe or the US, there are privacy issues. With regard to the privacy issues in Europe or the US, a current LTE-Uu based V2X system or a V2X system using an MBMS function has privacy issues described below.

Changing UE's identity overly frequently is not necessary and could cause the fast exhaustion of the identity space. V2X security requirement does allow UE being trackable in a short time scale, e.g. a few minutes. For example, some tracking of a vehicle UE by other vehicle UEs nearby is necessary to run V2X application algorithms that predict the trajectory of vehicles. User privacy is concerned with longer time scale, e.g. during a journey from home to the work place, etc.

Within the V2V messages that each UE sends, there is some uniquely identifiable information, e.g. the temporary ID in the BSM blob, the L2 ID when PC5 is used, the IP address and EPS identifiers when LTE-Uu is used. These identifiers together with the location information within the V2X message can be used to track a UE. In FIG. 1 this is illustrated by showing vehicle trajectories (along a road) in different colors, where the color is unchanged for a short time period. In order to make correlation between consecutive short-time-periods difficult, the uniquely identifiable information has to change for all UEs at one exact time instance. Otherwise, if only a single UE changes the identifiers, the system will still be able to link the UE before and after the change.

However, for LTE-Uu based V2X, the UE exchanges message with V2X Application Server (hereinafter, V2X App Server or V2X AS) via LTE system. Therefore, it may result in the need for introducing new UE identifiers that hide the 3GPP identity from other UEs and the network itself (e.g. V2X App Server). For LTE-Uu based V2X, the traffic goes through the V2X App Server, before it is forwarded to the other UEs. Therefore, the system must make sure that the V2X App Server hides the source UE identity. However, for LTE-Uu based V2X, it implies that UE identifiable information should change periodically so as not to allow longer-term tracking by the network or the V2X application server or other UEs. This would have significant network architecture impacts.

From the perspective of meeting the requirement that the network will not be able to track individual UEs, we make the following observations:

1. The V2X message contents are visible to the network and the 3rd party entity, e.g. V2X AS, since the messages cannot be encrypted. This messages provides precise location of the UE.

2. Since traffic is traversing the network, the PLMNs involved may be able to track UEs based on their 3GPP identities (e.g. IMSI, TMS1 etc.).

3. The network/3rd Party can track the UE based IP address of UE because:

The uplink traffic is sent to the V2X AS using the IP address allocated by the LTE network.

If the IP address does not change, V2X AS could derive the UE's path history using the contents of V2X message and the long lasting IP address.

4. When the identity needs to be rolled, all of the UE's identities and addresses need to change as well, otherwise, the network would be able to track the UE. These identifies include:

Application-layer identifiable information in the V2V message (e.g. key used to sign safety messages);

Transport layer identifier, e.g. IP addresses;

Identity used to establish the EPS connectivity (e.g. IMSI, TMSI); and/or

Radio Layer identifier, e.g. the C-RNTI.

If a UE has regular user traffic on the Uu interface being transferred in parallel to the V2X traffic, these two types of traffic may be correlated. Therefore, the EPS connection used for the V2X communication should not be shared with any other applications (that does not have the same security requirements as V2X), and this applies to all the identifiers used for this EPS connection.

In consideration of the privacy issues present in the LTE-Uu based V2X system or the V2X system using the MBMS function, the present invention proposes a vehicle using V2X communication and methods for guaranteeing privacy of a user of a vehicle using V2X communication. Hereinafter, a V2X UE may also be referred to as a V-UE.

<Likability of IP Address to Vehicle Identity>

For the V2X AS to link an identified IP address to a specific vehicle, following condition should be met:

Regardless of whether the IP address of each V-UE is assigned by one coordinating node or by each V-UE itself each V-UE uses a distinct IP address.

Otherwise, if V-UE 1 and V-UE 2 use same IP address, the V2X AS cannot relate an application layer identity with the IP address. Especially, if V-UE 3 changes the self-assigned IP address and the application layer identity simultaneously from (IP A, App ID 1) to (IP B, App ID 2), the V2X AS cannot know whether (IP B, App ID 2) is used by existing V-UE 3 or by new V-UE 4 which just switched on its V2X module.

For Non-IP type message such as CAM (Co-operative Awareness message)/DENM (Decentralized Environmental Notification Message)/BSM (Basic Safety Message): Since an IP based network uses a P/L-GW up to a V2X AS, the CAM/DENM/BSM should be encapsulated into an additional protocol layer, for example, an IP. If all non-IP type messages generated by different V-UEs are bundled into one flow between the P/L-GW and the V2X AS, since the relationship between an IP address and a V-UE is formed as 1:N correspondence rather than 1:1 correspondence, there is no way for the V2X AS to individually track each V-UE based on the IP address. In fact, even when a separate flow is used up to a P/L-GW duration by each V-UE, the P/L-GW may randomly change an IP address of an IP protocol header at any time.

For IP messages: It may be assumed that LTE V2X uses a separate PDN/APN only for LTE V2X. It may be also assumed that a specific V2X AS is allocated to a different PDN/APN for LTE V2X. Then, all the IP messages received by the L/P-GW from V-UEs can be forwarded to the specific V2X AS. Because safety V2X messages are meant to be received by any V-UE, there is no need to support the case where V2X messages from V2X AS is delivered to the specific V-UE. Then, allocating same IP address to all V-UEs belonging to same PDN/APV for LTE V2X does not cause any problem.

In actuality, a current assumption in system architecture stage 2 (SA2) for LTE-Uu based V2X is that any V2X service is implemented by a plurality of V2X ASs, each V2X AS provides a service to a specific area, and, in this process, the respective V2X ASs provide a communication function by a combination of nodes providing different MBMS functions. In this case, the combination of the nodes providing the MBMS functions mean a combination of eNBs, MMEs, MCEs, MBMS-GWs, and L-GWs. For example, when a vehicle moves from area A to area B, the UE receives a service by an L-GW M in the area A and receives a service by another L-GW N in the area B. In addition, as the UE moves from the area A to the area B, the UE communicates with V2X AS R connected to the L-GW M and then communicates with V2X AS T connected to the L-GW N. That is, it is expected that a counterpart V2X AS of the UE will be replaced. This assumption seems to be realistic in consideration of the fact that an area governed by each combination of MBMS functions and by the V2X AS may not be that wide. For example, a vehicle driving in a city A will not require V2X information generated in a city B. However, it is undesirable to cause a V-UE that has moved to a new area to find out an IP address of a new V2X AS behind an L-GW of the area because temporary service interruption which may occur while the V-UE finds out a new IP address in V2X communication is needed. In addition, upon considering QoS, if data about safety and other data are mixed, since the data about safety may affect QoS, traffic other than V2X may not be permitted in an APN/PDN using LTE V2X. Accordingly, a link to a V2X AS related to an L-GW used for V2X to the L-GW may be regarded as nearly one-to-one correspondence under the consideration that different V2X ASs are connected to respective L-GWs and there is no other non-V2X data. Then, IP addresses used by respective V-UEs are not important because all traffic may be transferred only to a related V2X AS regardless of the IP addresses.

The ITS application layer of V-UE just broadcast ITS message and does not care whether the message is received by other V-UEs over PC5 interface or whether the message is received by V2X AS over Uu interface. So, tunneling all V2X message received at P/L-GW from V-UEs to a specific V2X AS will not cause any issue. Then, making V-UE use well-known IP address as source/destination IP address for V2X PDN is a potential way forward.

An operation according to the present invention will be described in more detail hereinbelow.

An L-GW or a P-GW transmits UL data received thereby (i.e., transmitted by a UE) to a predesignated specific application server. If the UL data received by the L-GW or the P-GW is an IP message, the L-GW or the P-GW transmits the data after changing a source IP address or a destination IP address of the IP message to a specific value. The specific source IP address or destination IP address is pre-configured for the L-GW or the P-GW. If the preconfigured value is not present, an arbitrary value is used as the source IP address or the destination IP address.

If a UE is permitted to use a specific PDN/APN, the UE may select an IP address to be randomly used thereby. The PDN/APN may be a PDN/APN related to V2X.

A V-UE that desires to use a specific V2X service establishes PDN connectivity for the specific V2X service and transmits a PDN connectivity request to a network with respect to the PDN/APN mapped to the specific V2X service in order to request that the network allocate an IP address corresponding to PDN connectivity. Upon receiving the connectivity request for the specific PDN/APN from the V-UE, the network may allocate a predesignated value, for example, a specific IP address value (as a source IP address). The predesignated value may be equal or may be commonly used with respect to all UEs that have requested connectivity to the PDN/APN. For example, the UE may request that the network allocate the IP address by transmitting the PDN connectivity request to the network. If the PDN connectivity request is related to a V2X PDN or APN, the network (e.g., P-GW or L-GW) may transmit a specific value identically or commonly allocated to all UEs belonging to the PDN/APN to the UE as an IP address. The PDN connectivity request may include APN information defined for V2X. The network may allocate the same IP address to all UEs that have transmitted the PDN connectivity request including the same APN information defined for V2X. As opposed to the case in which different IP addresses are allocated to different UEs even for the same PDN/APN in a legacy system, the same IP address is allocated to all UEs that have transmitted the PDN connectivity request for a specific PDN/APN defined for V2X according to the present invention. Therefore, since UEs that have accessed the specific PDN/APN use the same IP address, each vehicle cannot be tracked.

As another method, the UE may be designated so as to use a specific IP address with respect to a specific PDN/APN. For example, the network may transmit, through a system information block (SIB) or an attach procedure, IP information about an IP address that the UE should use when transmitting a message to the specific PDN/APN. Upon receiving the IP address information, the UE may use the IP address when transmitting data to the PDN/APN. The IP address information may be transmitted to the UE using a method such as open mobile alliance device management (OMA DM). Alternatively, the IP address information may be stored in a subscriber identity module (SIM). A UE with the IP address information stored in the SIM may be introduced. Alternatively, if the IP address is allocated to the UE, the allocated IP address may be stored in the SIM of the UE. The network may inform the UE of whether to store the IP address allocated to the UE in the SIM. An IP address that should be used with respect to each application may be additionally designated to the specific PDN/APN.

An IP address may be designated on an application basis without PDN/APN information. For example, when a V2X service is permitted to be used by any V-UE, the V-UE receives an SIB in a cell in which the V-UE resides. For example, the SIB may include information about a source IP 10.10.10.10 and a destination IP 10.10.10.11 for application 1 and information about a source IP 101.101.101.101 and a destination IP 101.101.101.111 for application 2. Upon receiving the SIB, if a message to be transmitted by the UE is generated in application 1, the UE may fill an IP header of data related to application 1 using the source IP 10.10.10.10 and the destination IP 10.10.10.11 and, if a message to be transmitted by the UE is generated in application 2, the UE may fill an IP header of data related to application 2 using the source IP101.101.101.101 and the destination IP 101.101.101.111. Next, the UE transmits the data. IP addresses may be notified through an OMA DM instead of the SIB or IP address configuration information may be stored in the SIM.

Upon receiving the aforementioned IP information, the UE or the network node operates as indicated by the information.

With respect to any V2X service data, in a process in which data generated by the UE is transferred to an L/P-GW, if the data transmitted by the UE does not include an IP protocol, the L/P-GW will unconditionally transmit the data to a specific V2X server because there is no IP information. Accordingly, presence of a one-to-one link between the P/L-GW and the V2X server may be considered. In this case, since all data mapped to the V2X service will be transmitted to a designated V2X AS regardless of the UE, it is impossible for the V2X AS to track the data as belonging to a specific UE by use of received data. Alternatively, in the above process, the L-GW will add an arbitrary IP address to the data received from the UE and then forward all traffic to a preset V2X server regardless of which UE has transmitted a message. In this case, it is impossible for the V2X AS to track the data as belonging to a specific UE by use of the received data.

<Use of Other UE Instance for Other Traffic>

For Non-V2X service such as voice call or streaming service etc, the V-UE may use separate PDN/APN. This is already the case for the vehicles available today installed with internet connectivity. For V2X, the system architecture stage 1 (SA1) technical specification (TS) has following requirements.

The E-UTRAN shall be capable of transferring messages via 3GPP network entities between a UE and an application server both supporting V2N application with an end-to-end delay no longer than 1000 ms.

The 3GPP network shall provide a means for the mobile network operator (MNO) to authorize UEs supporting V2X application separately to perform V2N communication.

From these requirements, it is clear that there are two types of V2X data, one for V2I/V/P and one for V2N. V2N service is something that vehicle equipped with Release 13 UE can use. One example is a navigation App available today. From user perspective, it is the application using normal internet PDN which other general application also use. Also, considering the MBMS-based structure for LTE Uu-based V2X, V2X messages over LTE-Uu are basically broadcast-type messages. Then, other V2X message which basically non-broadcast type is transported over separate PDN. Based on these points, privacy issue is (?? does) not necessarily lead to multiple UE instances. Rather, using multiple PDNs for traffic of different characteristics/requirements are enough.

That is, the present invention proposes that a V2X message of a broadcast type and a V2X message of a non-broadcast type be transmitted through different channels. the present invention proposes that the V2X message of the broadcast type and the V2X message of the non-broadcast type be transmitted through different PDNs. The present invention proposes that the V2X message of the broadcast type and the V2X message of the non-broadcast type be transmitted through different APNs.

When the UE supports the V2X message, the UE may request a channel configuration for transmitting the message or requests a PDN/APN configuration. A PDN/APN value for the V2X message of the broadcast type may be predesignated as a specific value. A PDN/APN value for the V2X message of the non-broadcast type may be predesignated as a specific value.

For the present proposal, a network, a V2X service provider, or a V2X application may provide the following information to the UE.

- Information about a message of a broadcast property and/or information about a message of a non-broadcast property. Each of the message of the broadcast property and the message of the non-broadcast property may include information about a corresponding protocol and include information about a corresponding application. In other words, information about a message/protocol/application corresponding to the message of the broadcast property and information about a message/protocol/application corresponding to the message of the non-broadcast property may be provided. For example, the information about the application may include information such as a PSID. The message of the broadcast property and the message of the non-broadcast property may be designated using an ID per V2X application defined in IEEE 1609.12 etc. as the information about the application. Information about a receiver (e.g., a destination IP address) and information about a transmitter (e.g. a source IP address) may be used as information about the messages of the broadcast/non-broadcast property.
- Alternatively, an information message corresponding to V2V/V2I/V2P may be designated as the broadcast property.
- Alternatively, an information message corresponding to V2N may be designated as the non-broadcast property.
- Alternatively, message properties may be distinguished according to whether a message is a V2X message related to safety or a V2X message related to non-safety.

When a UE requests that a P-GW/L-GW transmit data to a specific APN/PDN, if the data does not use an IP address, the P-GW/L-GW may transmit the data to a predesignated specific application server or a specific IP address.

Alternatively, when the UE requests that the P-GW/L-GW transmit data to the specific APN/PDN, the P-GW/L-GW transmits the data to a predesignated specific application server or a specific IP address regardless of information of a destination IP address of the data.

Alternatively, which IP should be used to transmit corresponding data with respect to each V2X application or to which application server the data should be transmitted may be designated to the P-GW/L-GW. For example, any P-GW or L-GW may be configured to use a source IP 10.10.10.10 and a destination IP 10.10.10.11 for application 1 and a source IP 101.101.101.101 and a destination IP 101.101.101.111 for application 2. Next, upon receiving any data transmitted by the UE, the P-GW and/or L-GW analyzes the data. If the data is generated in application 1, the P-GW and/or L-GW may change or fill an IP header value using the source IP 10.10.10.10 and the destination IP 10.10.10.11 and then transmit the data to an external network. If the data is generated in application 2, the P-GW and/or L-GW may change or fill the IP header value using the source IP 101.101.101.101 and the destination IP 101.101.101.111 and then transmit the data to the external network.

The UE may determine whether a message to be transmitted thereby has the broadcast property or the non-broadcast property according to the above-described broadcast/non-broadcast information and transmit corresponding data to an APN or PDN designated according to a determination result.

Figure 11:
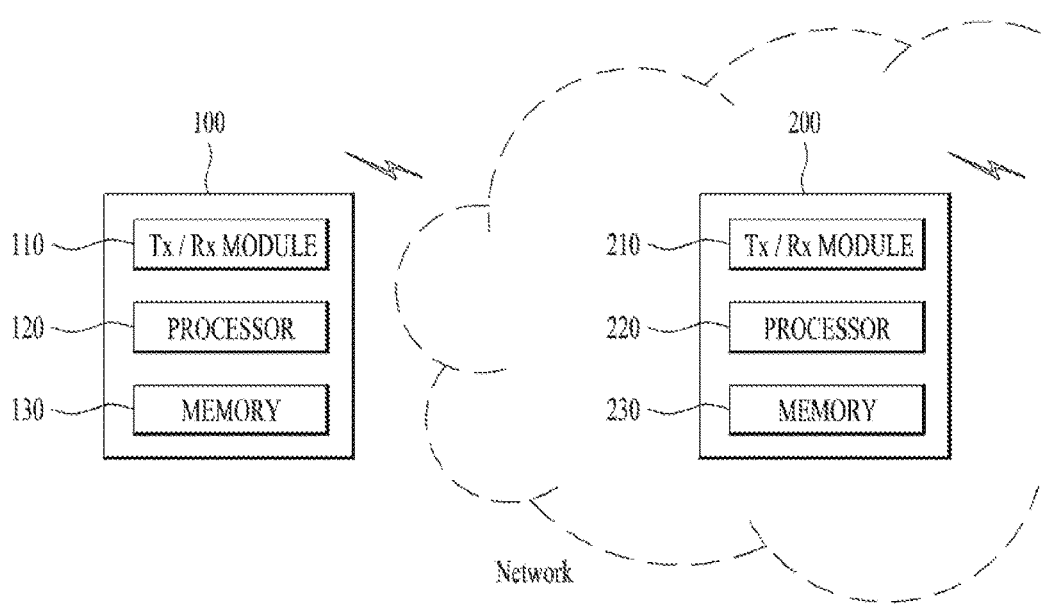
FIG. 11 illustrates a node according to an embodiment of the present invention.

FIG. 11 illustrates configuration of a UE and a network node according to a preferred embodiment of the present invention.

The UE 100 according to the present invention may include a transceiver 110, a processor 120, and a memory 130. The transceiver 110 may be referred to as a radio frequency (RF) unit. The transceiver 110 may be configured to transmit and receive various signals, data and information to and from an external device. The UE 100 may be connected to the storage device by wire and/or wirelessly. The processor 150 may control overall operation of the UE 100, and be configured to calculate and process information for the UE 100 to transmit and receive to and from the external device. In addition, the processor 120 may be configured to perform the proposed operations of the UE. The memory 130 may store the calculated and processed information for a predetermined time, and may be replaced by another constituent such as a buffer (not shown).

Referring to FIG. 11, the network node 200 according to the present invention may include a transceiver 210, a processor 220 and a memory 230. The transceiver 210 may be referred to as an RF unit. The transceiver 210 may be configured to transmit and receive various signals, data and information to and from an external device. The network node 200 may be connected to the storage device by wire and/or wirelessly. The processor 220 may control overall operation of the network node 200, and be configured to calculate and process information for the network node 200 to transmit and receive to and from the external device. In addition, the processor 220 may be configured to perform the proposed operations of the network node. The memory 230 may store the calculated and processed information for a predetermined time, and may be replaced by another constituent such as a buffer (not shown).

For configuration of the UE 100 and the network apparatus, the details described in various embodiments of the present invention may be independently applied or implemented such that two or more embodiments are simultaneously applied. For simplicity, redundant description is omitted.

The embodiments of the present invention may be implemented through various means. For example, the embodiments may be implemented by hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as an apparatus, a procedure, or a function that performs the functions or operations described above. Software code may be stored in a memory unit and executed by a processor. The memory unit is located at the interior or exterior of the processor and may transmit and receive data to and from the processor via various known means.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

The communication method described above is applicable to various wireless communication systems including IEEE 802.16x and 802.11x systems as well as a 3GPP system. Furthermore, the proposed method is applicable to a millimeter wave (mm Wave) communication system using an ultrahigh frequency band.

What is claimed is:

1. A method of transmitting Internet protocol (IP) address information by a network node in a wireless communication system, the method comprising:
   receiving IP address allocation requests from a plurality of user equipments (UEs);
   allocating IP addresses to the plurality of UEs, respectively; and
   communicating with the plurality of UEs based on the respective IP addresses,
   wherein the IP address allocation requests include first IP address allocation requests not related to vehicle-to-everything (V2X) communication from first UEs and second IP address allocation requests related to the V2X communication from second UEs,
   wherein allocating the IP addresses comprises:
      allocating different IP addresses to the first UEs in response to the first IP address allocation requests not related to the V2X communication; and
      allocating a same IP address to all of the second UEs in response to the second IP address allocation requests related to the V2X communication, and
   wherein the same IP address allocated in response to the second IP address allocation requests related to the V2X communication is a specific IP address defined for the V2X communication is a specific IP address defined for the V2X communication.

2. The method according to claim 1, wherein each of the IP address allocation requests is received in a packet data network (PDN) connectivity request message.

3. The method according to claim 1, wherein each of the second IP address allocation requests is a request for connectivity to a packet data network (PDN) for the V2X communication or an IP address allocation request associated with an access point name (APN) for the V2X communication.

4. The method according to claim 1, further comprising:
   receiving uplink V2X data from at least one of the second UEs based on the specific IP address.

5. The method according to claim 4, further comprising:
   transmitting the uplink V2X data to an application server for the V2X communication.

6. The method according to claim 1, wherein the network node is a packet data network (PDN) gateway.

7. A network node for transmitting Internet protocol (IP) address information in a wireless communication system, the network node comprising:
   a transceiver; and
   a processor configured to control the transceiver,
   wherein the processor is configured to:
      control the transceiver to receive IP address allocation requests from a plurality of user equipments (UEs);
      allocate IP addresses to the plurality of UEs, respectively; and
      control the transceiver to communicate with the plurality of UEs based on the respective IP addresses,
   wherein the IP address allocation requests include first IP address allocation requests not related to vehicle-to-everything (V2X) communication from first UEs and second IP address allocation requests related to the V2X communication from second UEs,
   wherein the processor allocates the IP addresses by:
      allocating different IP addresses to the first UEs in response to the first IP address allocation requests not related to the V2X communication; and
      allocating a same IP address to all of the second UEs in response to the second IP address allocation requests related to the V2X communication, and
   wherein the same IP address allocated in response to the second IP address allocation requests related to the V2X communication is a specific IP address defined for the V2X communication.

8. The network node according to claim 7, wherein each of the IP address allocation requests is received in a packet data network (PDN) connectivity request message.

9. The network node according to claim 7, wherein each of the second IP address allocation requests is a request for connectivity to a packet data network (PDN) for the V2X communication or an IP address allocation request associated with an access point name (APN) for the V2X communication.

10. The network node according to claim 7, wherein the processor controls the transceiver to receive uplink V2X data from at least one of the second UEs based on the specific IP address.

11. The network node according to claim 10, wherein the processor controls the transceiver to transmit the uplink V2X data to an application server for the V2X communication.

12. The network node according to claim 7, wherein the network node is a packet data network (PDN) gateway.

* * * * *